Patented June 24, 1930

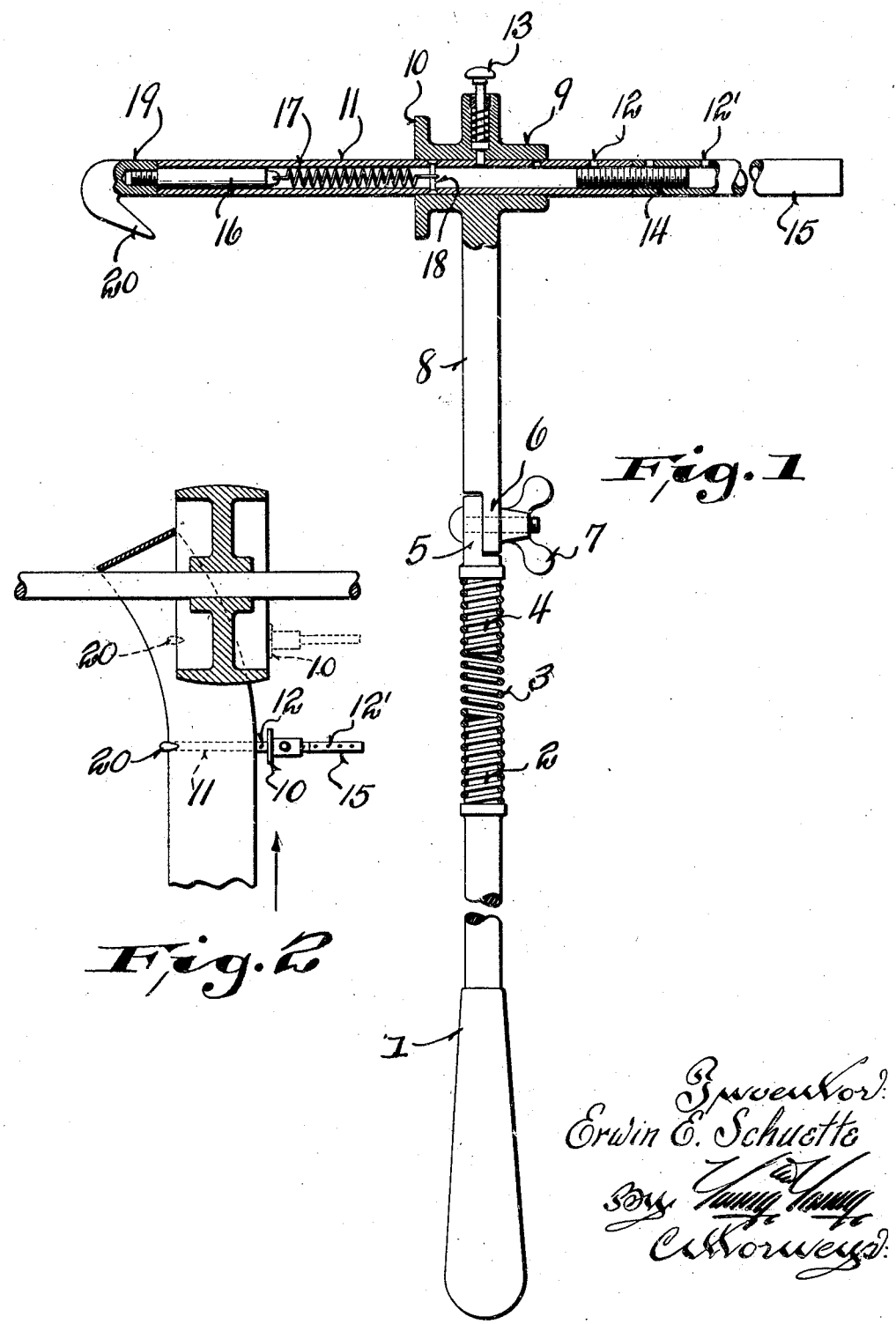

1,767,155

UNITED STATES PATENT OFFICE

ERWIN E. SCHUETTE, OF MILWAUKEE, WISCONSIN

BELT-REPLACING DEVICE

Application filed July 9, 1928. Serial No. 291,295.

This invention relates to a belt replacing device.

In shop practices, it is frequently the case that belts either run off the pulleys or are forced off the pulleys and allowed to run loose upon the shafts without driving the machinery normally connected to the line shaft by means of the belt. It then becomes a serious problem to replace the belt without danger to the operator and without stopping the line shaft. Devices have been made to aid in replacing the belts, but these devices have not proven wholly satisfactory, as there is considerable danger of hanging onto the belt or onto the pulley with consequent danger to the operator.

This invention is designed to overcome the defects noted above, and objects of such invention are to provide a novel form of belt replacing device which is so constructed that it can be safely used even by an unskilled operator to replace a belt upon a rotating pulley.

Further objects are to provide a belt replacing device which is equipped with means adapted to cooperate with the pulley for correctly positioning the belt, and additional means for cooperating with the belt and pulley, so that it initially engages both the belt and pulley and thereafter is automatically disengaged from the pulley as it is carried around a portion of the pulley.

Further objects are to provide a device which is adjustable to accommodate belts and pulleys of different widths, and which is provided with flexible means intermediate the handle and the active portion of the device, so as to permit relative bending of the two ends of the device without shock to the operator.

A further object of this invention is to provide an adjustable upper portion of the device, so that the operator is enabled to reach any portion of the pulley or belt desired with the utmost ease.

An embodiment of the invention is shown in the accompanying drawings in which:

Figure 1 is a side elevation, partly in section, of the device;

Figure 2 is a horizontal sectional view through a pulley and belt showing the device in full lines as it initially engages the belt, and in dotted lines showing the device as it engages both the pulley and belt.

Referring to the drawings, it will be seen that the device comprises a handle 1 which is provided with a threaded upper portion 2 into which the convolutions of a relatively stiff helical spring 3 are coiled. The upper end of the spring is received by a similar member 4 which is equipped with a lip 5. A lip 6 is adjustably clamped to the lip 5 by means of the wing bolt 7 so that any desired angle may be obtained for the upper stem 8.

This stem 8 is provided with a hub 9 equipped with a relatively large flange 10 adapted to engage the side edge of a pulley, as will appear hereinafter.

The hub 9 is apertured transversely and receives the transverse bar or sleeve 11. This sleeve is provided with a plurality of apertures 12 into anyone of which the spring-pressed latch or plunger 13 may snap to thus adjust the width of the device. If desired, one end of the sleeve 11 may be internally threaded to receive the threaded plug 14 of an extension piece 15. This extension piece is provided with apertures 12' corresponding to the apertures 12, so that an even wider belt can be operated upon by connecting the extension piece, as shown in Figure 1. Normally, this extension piece is not used except where needed.

The outer end of the sleeve 11 slidably carries a plunger 16 which is urged inwardly by means of the spring 17. One end of the spring is fastened to the inner end of the plunger and the other end of the spring is fastened to a transverse rivet pin 18. The outer end of the plunger 16 is threaded and is screwed into the shank portion 19 of a hook 20. The hook 20 is rounded and tapers towards its inturned angular end.

In using the device, the operator adjusts the stem 8 at the desired angle and thereafter tightens the wing nut 7. He then engages the belt by hooking the hook 20 over one edge of the belt, as shown in full lines in Figure 2. He then moves the device towards the pulley and causes the flange 10 to engage one side of the pulley. The hook 20 then engages the inner face or the rim of the pulley on the opposite side from the flange 10. The belt is thus held to the pulley, and the belt and the upper portion of the belt replacing device are carried around by the rotating pulley.

The hook 20 freely turns as the plunger 16 may freely rotate in the sleeve 17, and consequently the hook freely adjusts itself to any desired position with reference to the pulley as it is carried around by the pulley. As the upper portion of the pulley is approached, the hook rides free of the inner edge of the rim of the pulley due to its slanting or angular position, and thus automatically disengages itself from the pulley and belt. The operator may then lift the device from the region of the belt and pulley with the utmost ease.

In view of the fact that pulleys sometimes rotate at a considerable speed, the cushioning means in the form of the spring 3 has been provided which cushions any sudden shock that may be given the upper portion of the device, and thus relieves the operator of any of the shocks or jars incident to replacing belts.

Further, the adjustable connection between the upper and lower portions of the device, as well as the cushioning device, permits the device to reach around the pulley and shaft to a considerable extent and thus materially aids in the ease with which the belt can be replaced.

In actual operation, it has been found that the device works in an eminently satisfactory manner and allows the replacing of belts by an operator who stands upon the floor beneath the line shaft or jack shaft and replaces the belt without any danger whatsoever.

It will be seen further that the device is of simple and sturdy construction and may be very readily made and easily manipulated.

Although the invention has been described in considerable detail, such description is intended as illustrative rather than limiting as the invention may be variously embodied and as the scope of such invention is to be determined as claimed.

It is to be understood that the end member 19 may be adjusted upon the threaded stem of the plunger 16 to thereby vary the tension of the spring.

I claim:

1. A belt replacing device comprising a standard, a hub carried by the upper portion of said standard, a transverse sleeve carried by said hub and provided with a plunger at its outer end, said plunger having an angularly arranged hook projecting therefrom outside of said sleeve, and resilient means urging said plunger inwardly.

2. A belt replacing device comprising a standard, a hub carried by the upper portion of said standard, a transverse sleeve carried by said hub and provided with a plunger at its outer end, said plunger having an angularly arranged hook projecting therefrom outside of said sleeve, resilient means urging said plunger inwardly, and a flange carried by said hub.

3. A belt replacing device comprising a standard having a hub at its upper end, said hub having a transverse aperture therethrough, a sleeve slidably carried by said hub, means for locking said sleeve to said hub in any desired position of adjustment, a plunger slidably carried by the outer end of said sleeve, a spring urging said plunger inwardly, a hook carried by the outer end of said plunger and having a tapered angularly set end adapted to engage a belt and the rim of a pulley, said hub having a flange adapted to engage the opposite rim of the pulley from that engaged by said hook.

4. A belt replacing device comprising a standard having an upper and lower end adjustably joined and adapted to be angularly set with reference to each other and having an intermediate resilient member adapted to cushion shocks imparted to the upper portion of said standard, a hub carried by the upper portion of said standard and having a flange at one edge and having a transverse aperture, a sleeve slidably carried in the transverse aperture of said hub and having a plurality of holes therein, a spring pressed pin carried by said hub and adapted to engage any of said holes, a plunger slidably carried within the outer end of said sleeve, and an angularly set tapered hook projecting from the outer end of said sleeve and attached to said plunger.

In testimony that I claim the foregoing I have hereunto set my hand at Milwaukee, in the county of Milwaukee and State of Wisconsin.

ERWIN E. SCHUETTE.